(12) United States Patent
Sloan (10) Patent No.: US 8,019,153 B2
(45) Date of Patent: Sep. 13, 2011

(54) WIDE LUMINANCE RANGE COLORIMETRICALLY ACCURATE PROFILE GENERATION METHOD

(75) Inventor: Rocklin Sloan, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 11/901,891

(22) Filed: Sep. 18, 2007

(65) Prior Publication Data

US 2009/0074244 A1 Mar. 19, 2009

(51) Int. Cl.
*G06K 9/00* (2006.01)
*G03F 3/08* (2006.01)

(52) U.S. Cl. .................... 382/167; 382/162; 358/518

(58) Field of Classification Search .......... 382/162, 382/167; 345/589–591; 358/518–523
See application file for complete search history.

(56) References Cited

U.S. PATENT DOCUMENTS

| | | | |
|---|---|---|---|
| 5,912,980 A | 6/1999 | Hunke | 382/103 |
| 6,115,492 A | 9/2000 | Meltzer et al. | 382/162 |
| 6,639,998 B1 | 10/2003 | Lee et al. | 382/103 |
| 6,888,648 B2 * | 5/2005 | Odagiri et al. | 358/1.9 |
| 2002/0012054 A1 | 1/2002 | Osamato | 348/273 |
| 2002/0044311 A1 | 4/2002 | Beisch et al. | 358/518 |
| 2002/0113880 A1 | 8/2002 | Iida et al. | 348/222 |
| 2004/0021784 A1 | 2/2004 | Vaughn | 348/254 |
| 2004/0150847 A1 | 8/2004 | Mahy | 358/1.9 |
| 2004/0228525 A1* | 11/2004 | Krabbenhoft | 382/162 |
| 2005/0280881 A1* | 12/2005 | Stokes et al. | 358/504 |
| 2006/0077405 A1* | 4/2006 | Topfer et al. | 358/1.9 |
| 2006/0103862 A1* | 5/2006 | Kurumisawa et al. | 358/1.9 |
| 2006/0262360 A1 | 11/2006 | Dalrymple et al. | 358/504 |
| 2007/0070364 A1* | 3/2007 | Henley | 358/1.9 |

OTHER PUBLICATIONS

ICC Specification ICC.1:2004-10 (2004).*
Mudry, Gerard, "Automatic Color Image Enhancement," Semester Project at Ecoles Polytechniques Federale de Lausanne (EPFL) (Winter Semester 2003-2004).
Chen, Cecilia Chao, "Illumination Invariant Image Enhancement," Simon Fraser University (Dec. 2002).
Hardeberg, Jon Yngve, "Acquisition and reproduction of colour images: colorimetric and multispectral approaches," Ecole Nationale Superieure des Telecommunications (1999).
"Digital photography color manarment basics," ICC White Paper #20 (Apr. 30, 2005).

* cited by examiner

*Primary Examiner* — Yubin Hung
(74) *Attorney, Agent, or Firm* — Fitzpatrick, Cella, Harper & Scinto (57) ABSTRACT

Generating a color profile for a digital input device. Color values for at least one color target positioned within a first scene are measured, the color target having multiple color patches. An image of the first scene is generated using the digital input device, the first scene including the color target (s). Color values from a portion of the image corresponding to the color target are extracted and a color profile is generated, based on the measured color values and the extracted color values. The generated color profile is used to transform the color values of an image of a second scene captured under the same lighting conditions as the first scene.

10 Claims, 8 Drawing Sheets

WIDE LUMINANCE RANGE COLORIMETRICALLY ACCURATE PROFILE GENERATION METHOD

BACKGROUND OF THE INVENTION

1. Field of the Invention

The invention relates to generating a color profile, and more particularly relates to generating a color profile for a digital input device, wherein the color profile can be used to transform color values of an image.

2. Description of the Related Art

Traditional color management systems (CMSs) use color profiles of digital input devices to derive color transformations that transform color coordinates between a device-dependent color space that depends on the device, and a device-independent color space.

In particular, a color profile for a digital input device such as a camera or scanner can be generated by first imaging a color target (or "color checker") consisting of pre-designated color patches. Typically, the color target is imaged under controlled lighting conditions, which can be achieved by placing the color target inside a light booth. In a device-dependent color space such as the RGB color space, this imaging typically results in an RGB bitmap image in which the color of each color patch is encoded in an RGB value. These RGB values are included in the color profile for the digital input device.

While this color profile can provide an adequate color transformation for images created under controlled lighting conditions, such a color transformation may not accurately transform images of real-world scenes having a wide luminance range.

Thus, it is desirable to generate color profiles which are likely to result in more calorimetrically accurate transformations of images created under real-world lighting conditions.

SUMMARY OF THE INVENTION

According to one aspect of the invention, a color profile for a digital input device is generated. Color values for at least one color target positioned within a first scene are measured, the color target having multiple color patches. An image of the first scene is generated using the digital input device, the first scene including the color target(s). Color values from a portion of the image corresponding to the color target are extracted and a color profile is generated, based on the measured color values and the extracted color values. The generated color profile is used to transform the color values of an image of a second scene. Using this generated color profile to transform images is likely to result in more calorimetrically accurate transformations of images created under real-world lighting conditions.

The digital input device can comprise a digital camera. The color profile can include an International Color Consortium (ICC) color profile. The at least one color target can comprise a plurality of color targets at different positions within the first scene. The first scene can comprise a plurality of lighting areas. The plurality of color targets can be positioned at different ones of the plurality of lighting areas. Each of the plurality of lighting areas can have a different illuminant value and degree of brightness. By using multiple color targets, each in differently illuminated areas within the first scene, a color profile with a wide luminance range can be created, thereby further increasing the colorimetric accuracy of image transformations.

A color value of at least one reference color patch (per target) can be measured for the at least one color target, and color values for the remaining color patches can be predicted, based on the measured color value. The color values for the remaining color patches can be predicted by applying a Chromatic Adaptation Transformation (CAT) to pre-measured color values for the at least one color target measured under controlled lighting conditions. By using the CAT to predict the values for the remaining color patches, multiple color checkers can be used in a scene without extensive colorimetric measurements, thereby simplifying the in scene measurement process and allowing for the completion of the measurement process before lighting conditions change.

The CAT can be used to transform colorimetric values between different illuminants. The CAT can include CAT97, CAT2000, and XYZ scaling. The reference color patch can be the brightest white patch of the at least one color target. The extracting step can comprise selecting the portion of the image corresponding to the at least one color target, locating each color patch in the selected portion of the image using a bi-linear interpolation process, sampling the pixels within a pixel area of each color patch, and determining a color patch value for each color patch based on the sampled pixels. A transformation can be created from the color profile, and the transformation can be used to transform the color values of the image of the second scene. The transformation can be a third order polynomial transformation.

According to another aspect of the invention, a color profile for a digital input device is generated using a computer program. A first image corresponding to a color target is selected, the color target having multiple color patches. Each color patch in the selected portion of the image is located using a bi-linear interpolation process. The pixels within a pixel area of each color patch are sampled and a color patch value for each color patch is determined based on the sampled pixels. A color profile is generated based on the determined color patch values and the color profile is used to create a transformation that will transform the color values of a second image. Using the computer program to determine values of color patches in an image corresponding to a color target is likely to simplify the process of generating a color profile.

The selected portion of the first image can be enlarged when it is selected. The multiple color patches can comprise four corner patches of the color target, and selecting the first image can comprise selecting four corner patches of the color target, specifying the number of color patches in the color target, determining the pixel area for each color patch, wherein the bi-linear interpolation process can use coordinates of the selected four corner patches and the specified number of color patches to locate remaining color patches of the color target.

The number of color patches in the color target can be specified as a number of rows of color patches and a number of columns of color patches. The computer program can display the pixel area of each color patch and the pixel area of each color patch can be verified. The pixel area of each color patch can be determined based on a pixel radius and a center of the color patch.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

Figure 1:
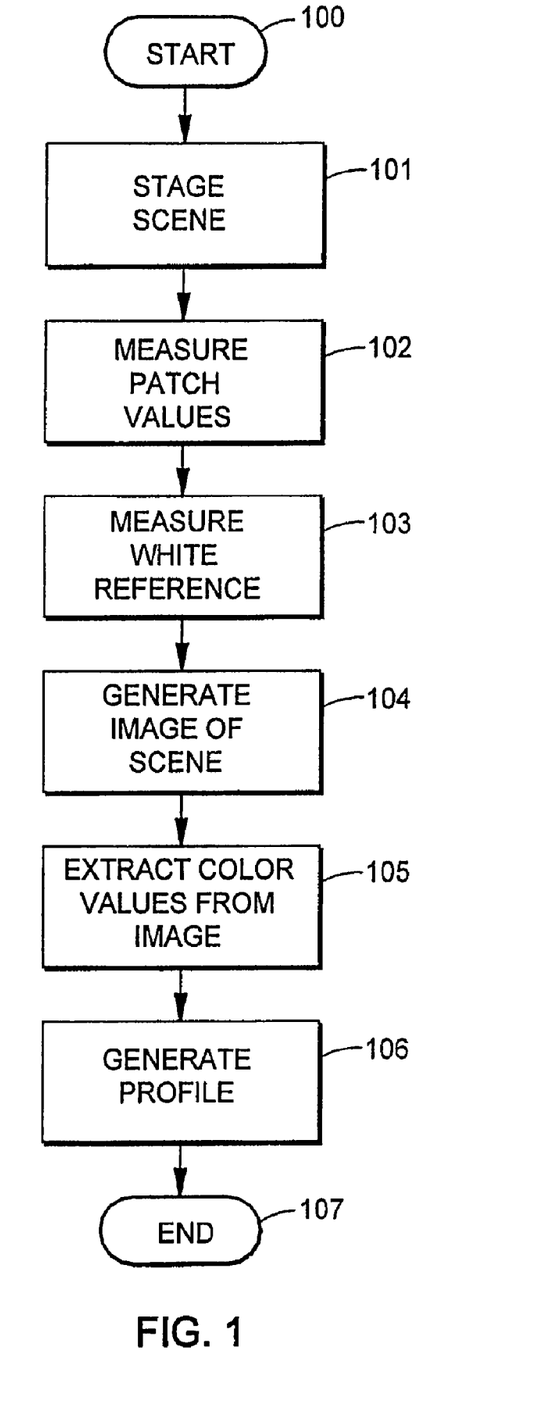
FIG. 1 is a flowchart depicting a process for generating a color profile for a digital input device in accordance with a representative embodiment of the invention.

FIG. 1 is a flowchart depicting a process for generating a color profile for a digital input device in accordance with a representative embodiment of the invention.

At block 100 all of the patches on each color target (e.g., color checker) have been pre-measured under consistent lighting conditions, using, for example, a calorimeter or spectrophotometer to obtain a set of tristimulus values (i.e., values corresponding to a device independent color space, such as, for example, the XYZ color space).

At block 101 a scene is staged to include two or more color targets, positioned in different lighting areas of the scene. For example, in scene 200 depicted in FIG. 2, color target 201 is placed in a first lighting area (e.g., direct sunlight) and color target 202 is placed in a second lighting area (e.g., shade). By positioning color targets so that the incident lighting upon each color target is as uniform as possible, the accuracy of the generated color profile can be increased.

Figure 2:
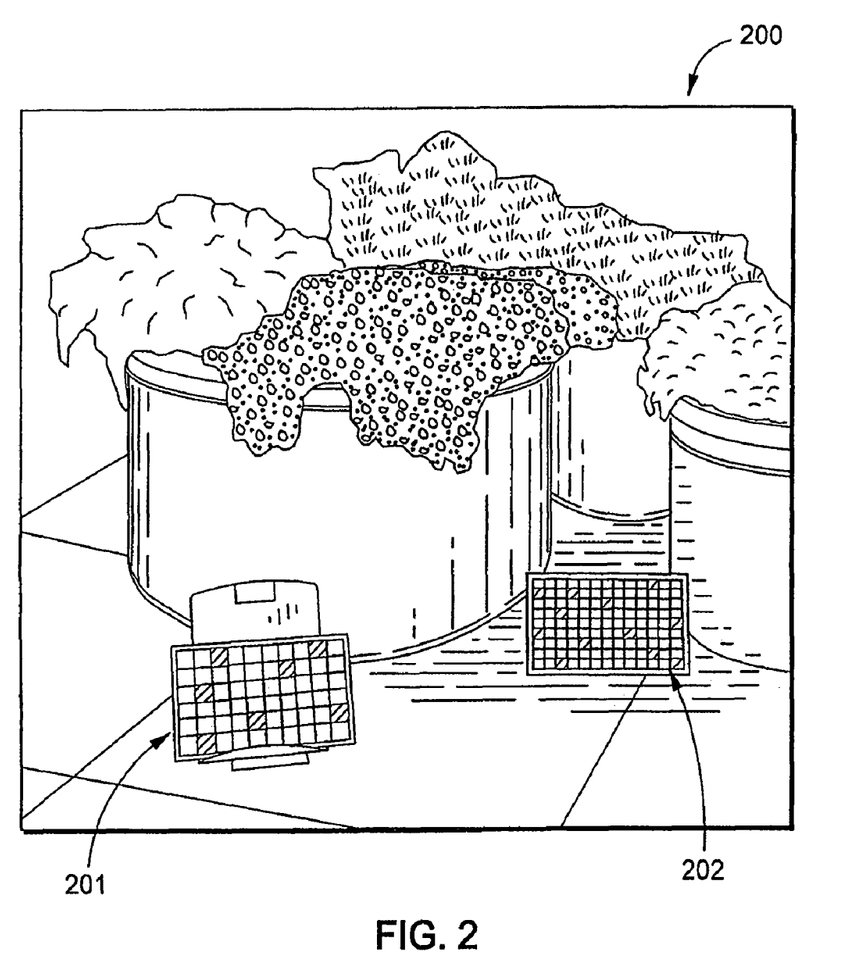
FIG. 2 is a pictorial view of a scene in accordance with a representative embodiment of the invention.

At block 102 the color value (i.e., tristimulus value) for a reference patch on each color target is measured while the color target is positioned in the scene (e.g., 200), using, for example, a colorimeter or spectrophotometer. The reference patch can be, for example, the brightest white patch on the color target. The tristimulus values (e.g., XYZ) for the remaining patches on each color checker are predicted using these in-scene reference patch values and the patch values pre-measured at block 100, as described below for FIG. 3.

At block 103 a white reference standard is measured to establish a white point. The white point is used to create a color transformation as described below. The white reference standard can be, for example, a halon disk placed in the brightest lighting area, the brightest white patch of the color target in the brightest lighting area (e.g., 201), or any other suitable white reference standard.

At block 104 an image of the scene (e.g., 200) is generated using a digital input device, such as, for example, a digital camera, and at block 105 device color values (i.e., color values generated when the digital input device renders the image, such as, for example, RGB color values) are extracted from the portions of the image corresponding to each color target in the scene (e.g., 201 and 202), as will be described below for FIG. 4.

Figure 10:
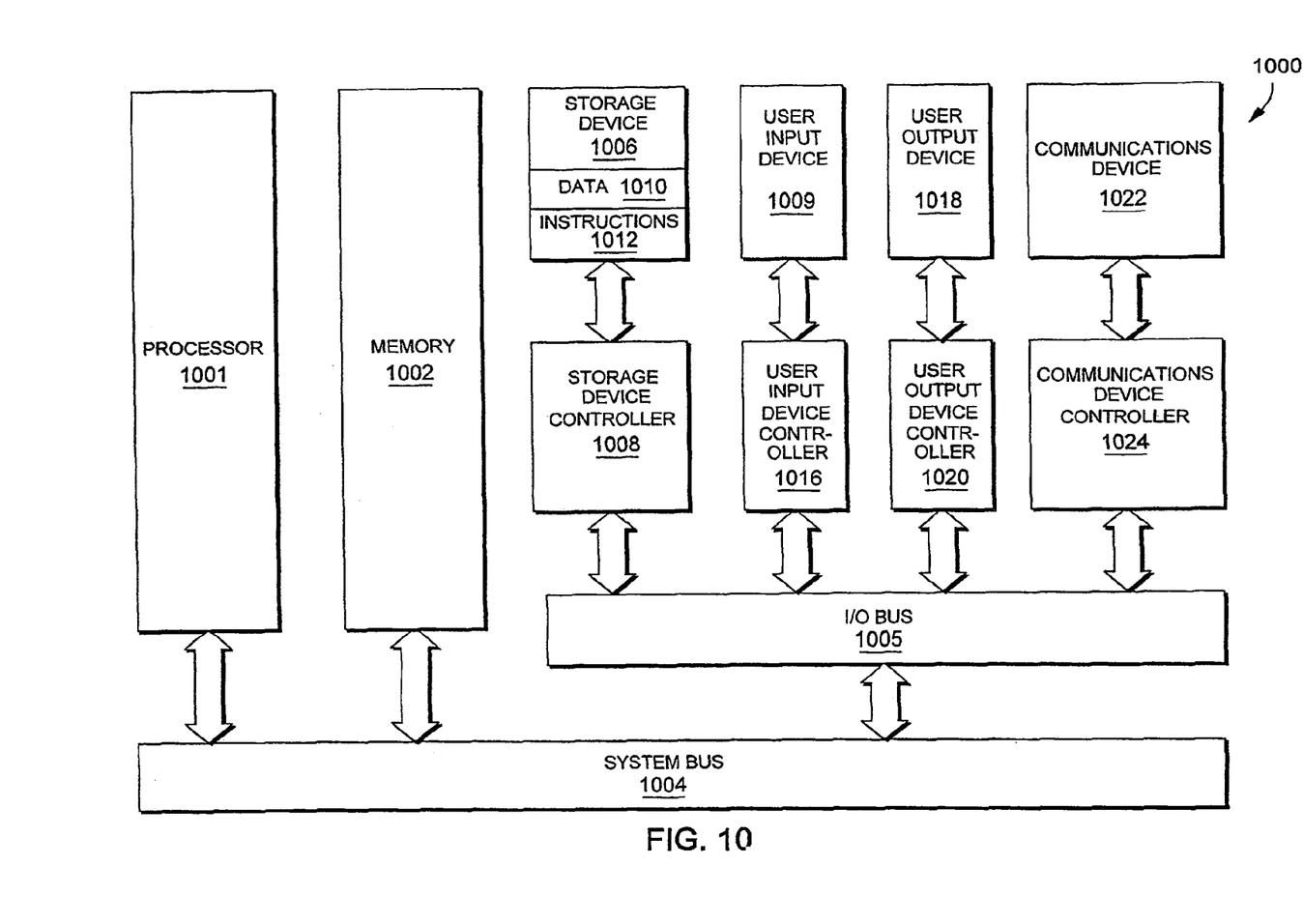
FIG. 10 is an architecture diagram for a data processing apparatus, such as a general purpose computing machine, suitable for performing a process for generating a color profile in accordance with a representative embodiment of the invention.

At block 106 the XYZ values (measured and predicted at block 102) and corresponding RGB values (extracted at block 105) for each color target (e.g., 201 and 202) are combined to form a color profile (e.g., an ICC profile), which can be stored, for example, on a memory (e.g., 1002 of FIG. 10) or on a storage device (e.g. 1006 of FIG. 10). Thereafter, processing proceeds to block 107 and ends.

This generated color profile is used to create a color transformation process that can take an arbitrary color value in the digital input device's color space (e.g., RGB) as input, and yield the device independent color value (e.g., XYZ) that would be predicted for a second scene, captured under lighting conditions similar to the lighting conditions of the profiled scene (e.g., 200).

The color transformation is created by solving for X in the following equation:

$$AX=B \qquad \text{Equation (1)}$$

A is the set of device dependent color values of the color profile (e.g., RGB values), B is the corresponding set of set of device independent values of the color profile (e.g., XYZ values), and X is the transformation that converts color values from a device dependent color space to a device independent color space. X can be a linear transformation or a polynomial transformation of any order. In an example embodiment of the invention, X is a third-order polynomial transformation.

B can be converted to a set of color values using a color space where an accepted calorimetric measurement standard can be used. For example, B can be converted to a set of CIE L*a*b* (Lab) values (using the white point obtained at block 103) so that, for example, $\Delta E94$ can be used as the measurement standard used to solve for X.

An iterative minimum-search solving method, such as, for example, the simplex algorithm, is used to solve for X. The objective function used in the solving method is seen to minimize the mean color difference (e.g., $\Delta E94$ color difference) between B and the values generated by converting A using X.

Using this color transformation (e.g., color transformation X), color values of an image of a second scene, captured under lighting conditions similar to the lighting conditions of the profiled scene (e.g., 200), can be transformed from the digital input device's color space to a device independent color space.

Because the color profile used to create this transformation has color values corresponding to different lighting areas, the color profile typically covers a wide luminance range, thereby resulting in more calorimetrically accurate transformations of images created under real-world lighting conditions.

Figure 3:
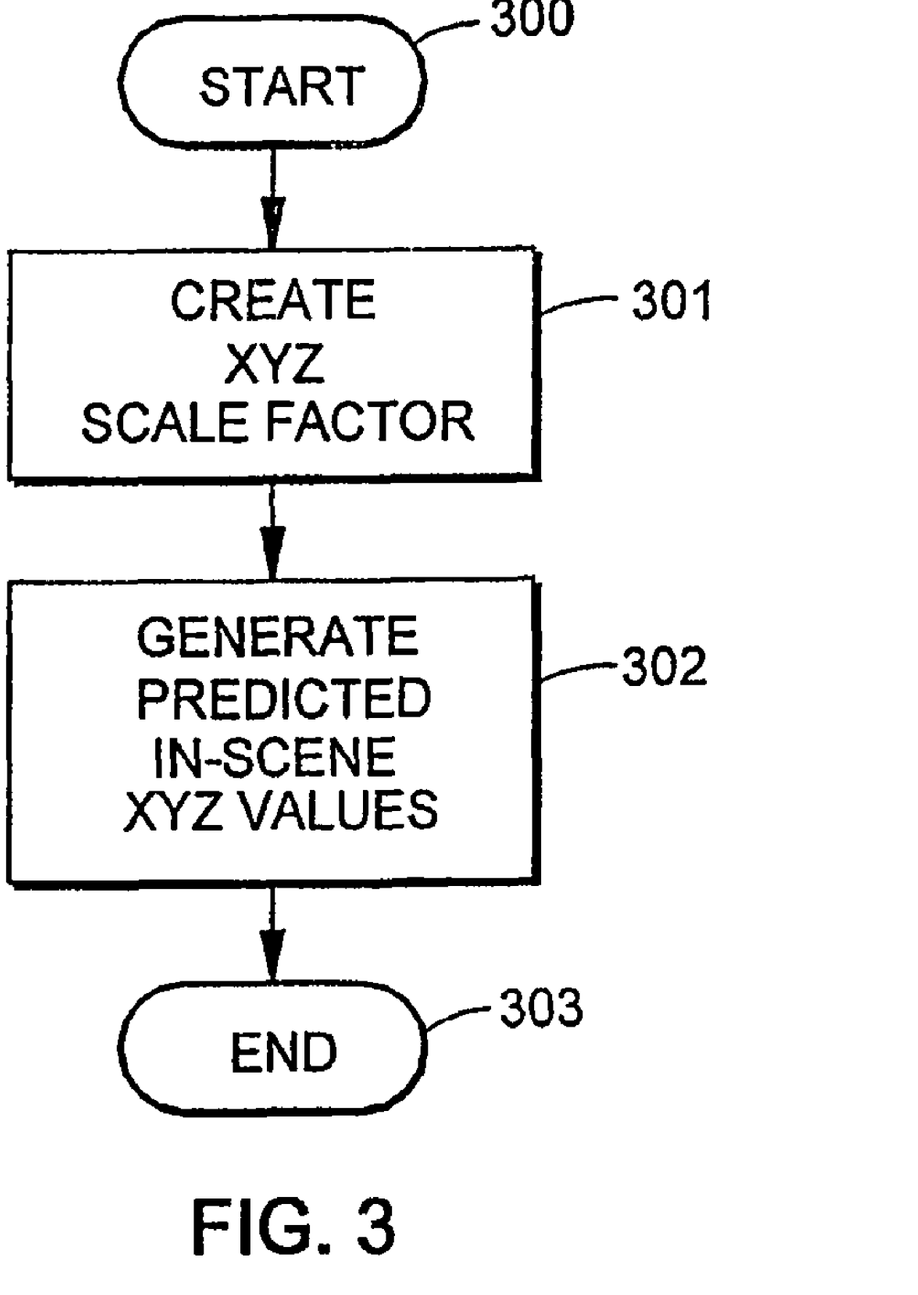
FIG. 3 is a flowchart depicting a process for using a Chromatic Adaptation Transformation (CAT) to predict values for color patches in accordance with a representative embodiment of the invention.

FIG. 3 is a flowchart depicting a process for using a Chromatic Adaptation Transformation (CAT) to predict tristimulus values for the color patches not necessarily measured at block 102 of FIG. 1. A CAT predicts what a certain color value under a particular lighting condition (illuminant) will be changed to if illuminated under a different lighting condition. Example CATs include XYZ scaling, CAT97, CAT2000, or any other CAT that can transform colorimetric values between different illuminants. An example embodiment where a CAT uses XYZ scaling to predict tristimulus values will be described, but in other embodiments other CATs may be used.

At block 300 all of the patches on each color target have been pre-measured under consistent lighting conditions (block 100) and the in-scene color value for a reference patch on each color target has been measured (block 102). Processing proceeds to block 301 where the in-scene XYZ values of each measured reference patch and the corresponding pre-measured XYZ values for each measured reference patch are used to create an XYZ scale factor (3-tuple).

The following equations are used to create an XYZ scale factor using the in-scene XYZ values and the pre-measured XYZ values:

$$X_{scale} = X_{scene}/X_{pre}$$

$$Y_{scale} = Y_{scene}/Y_{pre} \quad \text{Equations (2)}$$

$$Z_{scale} = Z_{scene}/Z_{pre}$$

In the above equations, "pre" represents pre-measured values of the reference patch of a color target, "scene" represents the measured (in-scene) value of the reference patch of a color target, and "scale" represents the resultant scale factor that can be applied to the remaining pre-measured XYZ values to generate in-scene XYZ values for the color patches that have not been measured in the scene.

At block 302 the XYZ scale factor is used to generate predicted in-scene XYZ values for the color patches that have not been measured in the scene (at block 102). A predicted in-scene XYZ value is generated by multiplying each X, Y and Z component of a patch value pre-measured at block 101 by the respective X, Y and Z scale factors. Thereafter, processing proceeds to block 303 and ends.

Figure 4:
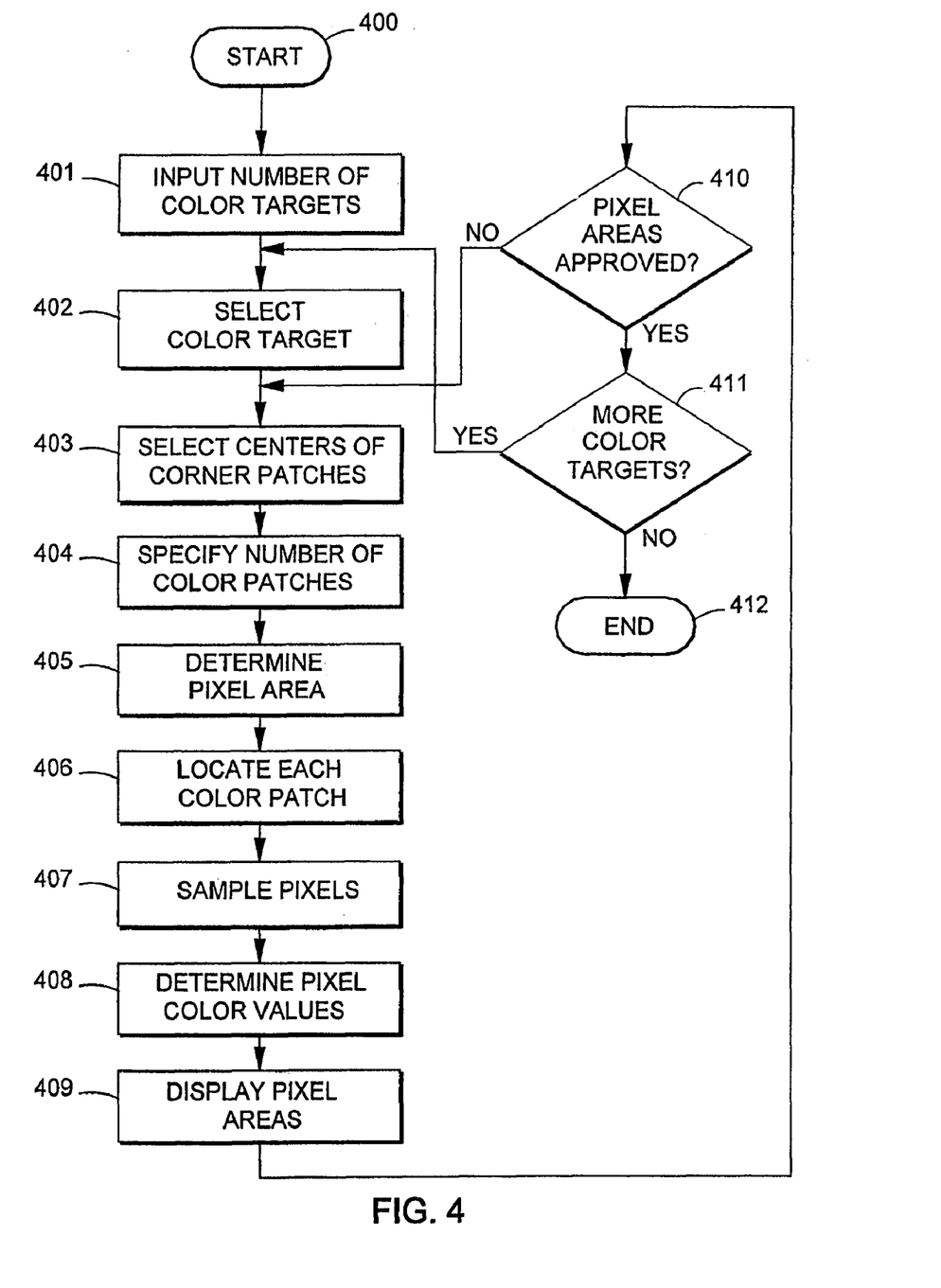
FIG. 4 is a flowchart depicting a process for extracting color values from an image in accordance with a representative embodiment of the invention.

FIG. 4 is a flowchart depicting a process for extracting color values from an image in accordance with a representative embodiment of the invention. An example embodiment using a data processing apparatus (e.g., 1000 of FIG. 10) to perform this process will be described. At block 400, the image of the scene generated at block 104 is displayed on a user output device (e.g., 1018 of FIG. 10) of the data processing apparatus, such as, for example, a display screen or a monitor.

At block 401, the data processing apparatus displays a user interface (using the user output device, e.g., 1018) that prompts a user to input the number color targets in the displayed image using a user input device (e.g., 1014 of FIG. 10).

Figure 5:
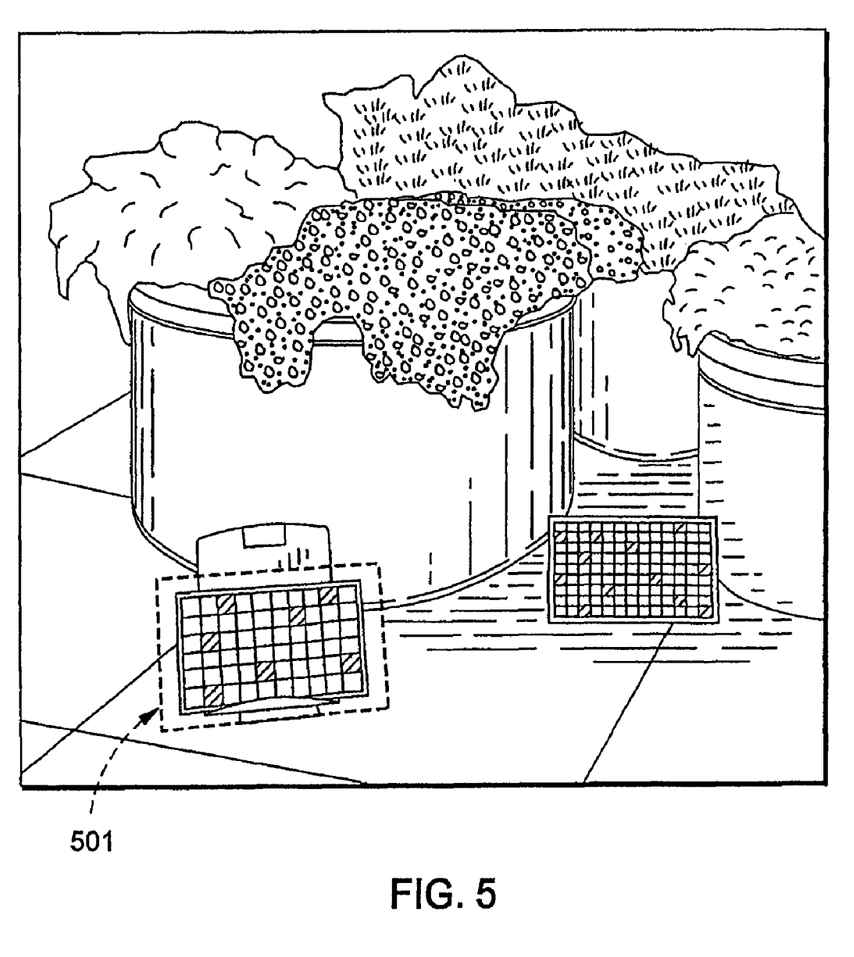
FIG. 5 depicts an example of a user interface for selecting an image in accordance with a representative embodiment of the invention.

In response to receiving the number of color targets input by the user, the data processing apparatus displays a user interface prompting the user to select a first color target (block 402). The user can select the color target by, for example, dragging a bounding box (e.g., 501 of FIG. 5) around the portion of the image corresponding to the color target. Once selected, the data processing apparatus can zoom in on (i.e., enlarge) the selected color target.

At block 403, the data processing apparatus displays a user interface prompting the user to select the center of the four corner patches of the selected color target, starting with, for example, the top-left patch, and proceeding, for example, clockwise, to the other corners.

At block 404, the data processing apparatus displays a user interface prompting the user to specify the number of color patches in the selected color target either by inputting the number of rows and columns of the color target, or by selecting a standard color target from a list of color targets, for which the number of rows and columns of color patches is known. If a standard color target is selected, the data processing apparatus can determine the total number of rows and columns of color patches by searching a look-up table (stored, for example, as data 1010 of FIG. 10) specifying the number of rows and columns for each standard color target.

Figure 6:
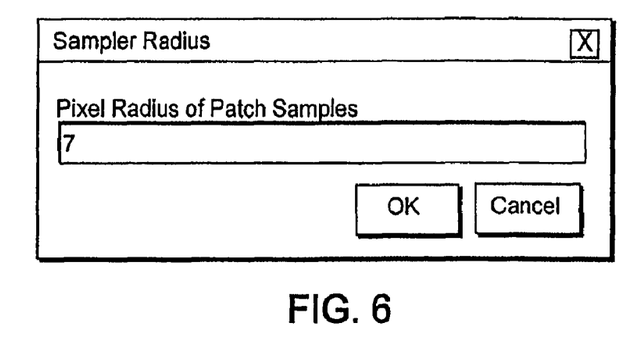
FIG. 6 depicts an example of a user interface for inputting a pixel radius in accordance with a representative embodiment of the invention.

At block 405, the data processing apparatus determines a pixel area for each color patch. The data processing apparatus can determine the pixel areas by, for example, displaying a user interface prompting the user to specify how many pixels of the image to sample for each patch. For example, the user interface (e.g., FIG. 6) can prompt the user to input a pixel radius (i.e., a distance, in units of pixels, from the center of a patch) that is used to determine the area around the center of a color patch from which to sample pixels. The area around the center of the color patch can be, for example, a circle (as determined by the pixel radius), a square circumscribed around a circle determined by the pixel radius, or any other suitable shape.

Alternatively, the data processing apparatus can determine a pixel area by, for example, testing pixels surrounding a center pixel of a color patch until patch borders are found. For example, the data processing apparatus can sample pixels surrounding the center pixel of the patch at a predetermined pixel radius and compare the color values of the pixels surrounding the center pixel with the color value of the center pixel. If the difference between the color values of the surrounding pixels and the center pixel is within a threshold, the pixel radius is increased and this process is continued until the difference in color values exceeds the threshold. The resulting pixel radius can be used to determine the area around the center of the color patch from which to sample pixels.

At block 406, the data processing apparatus locates each color patch in the portion of the displayed image corresponding to the selected color target. A bi-linear interpolation method (in 2D) is preferably used to determine the centers of the color patches based on the coordinates of the centers of the corner patches selected at block 403. Using the bi-linear interpolation method, rotation or skew of the color target position in the image is compensated, as will be described below for FIG. 9.

At block 407, the data processing apparatus samples the pixels of each patch within the pixel area, and at block 408 the data processing apparatus determines an average pixel color value for each patch.

Figure 7:
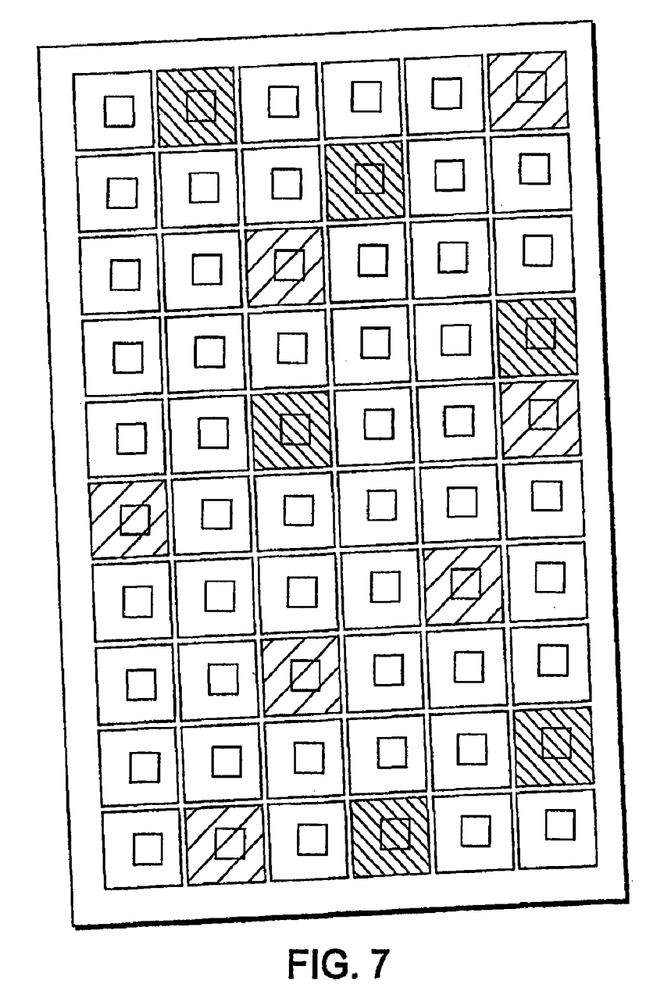
FIG. 7 depicts an example of a user interface for displaying pixel areas in accordance with a representative embodiment of the invention.

At block 409, the data processing apparatus displays the pixel area of each color patch on the user output device (e.g., 1018). The pixel areas can be displayed, for example, by superimposing pixel area borders onto the displayed image of the selected color target, as shown in FIG. 7.

At block 410, the data processing apparatus displays a user interface (e.g., FIG. 8) prompting the user to verify the pixel areas displayed for each color patch. If the user does not approve the displayed pixel areas by, for example, selecting button 801 of FIG. 8 ("NO" at block 410), data for the determined pixel areas is discarded, and processing proceeds to block 403 where the process for determining pixel values is restarted (beginning with the selection of the centers of the four corners of the selected color target).

Figure 8:
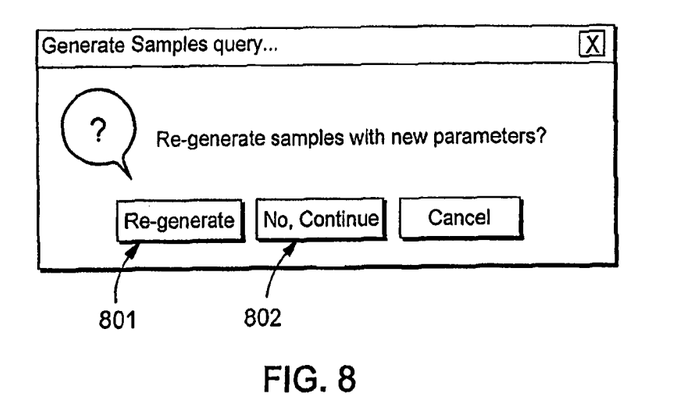
FIG. 8 depicts an example of a user interface for verifying pixel areas in accordance with a representative embodiment of the invention.

If the user approves the displayed pixel areas by, for example, selecting button 802 of FIG. 8 ("YES" at block 410), the data processing apparatus determines (block 411) whether there are remaining color targets to be processed, based on the number of color targets specified at block 401. If unprocessed color targets remain ("YES" at block 411), processing proceeds to block 402 where the process of identifying a color target and determining color values for each color patch is repeated. If unprocessed color targets do not remain ("NO" at block 411), processing proceeds to block 412 where processing ends.

Figure 9:
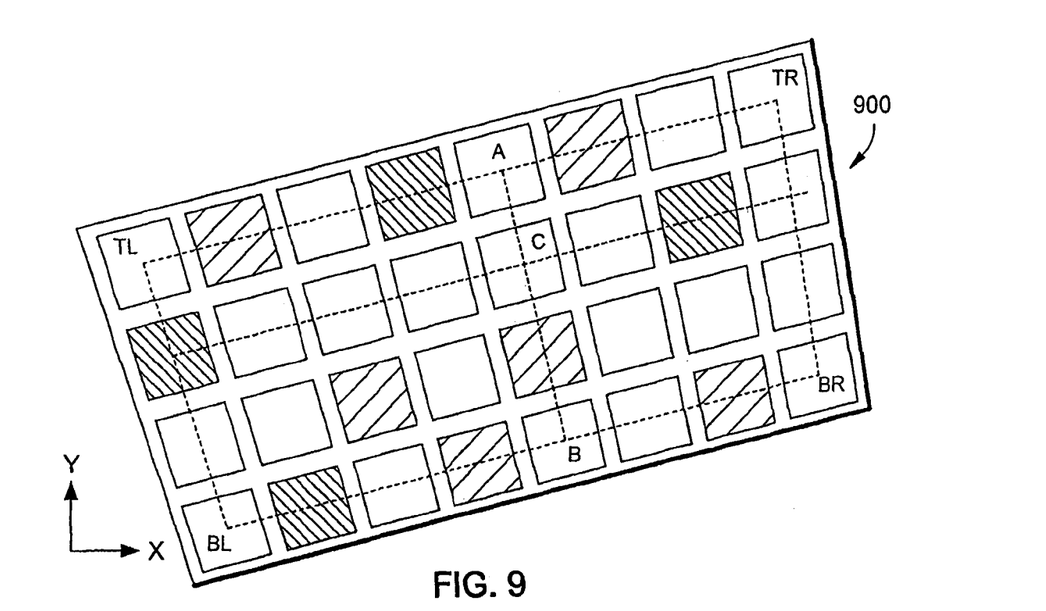
FIG. 9 is a diagram illustrating a bi-linear interpolation method for determining the centers of color patches of a color target in accordance with a representative embodiment of the invention.

FIG. 9 is a diagram illustrating a bi-linear interpolation method for determining the centers of color patches of a color target in accordance with a representative embodiment of the invention. Color target 900 is the color target selected at block 402 of FIG. 4. It is preferred that the patches on the color target are arranged in equidistant rows and columns, such that the center points of the patches are co-linear within each row or column. TL, TR, BL, and BR represent the centers of the top left, top right, bottom left, and bottom right corner patches selected at block 403 of FIG. 4.

A linear interpolation is performed on the top row of the color target to find the center points of all of the patches in the top row, using the top-left $(X_{TL}, Y_{TL})$ and top-right $(X_{TR}, Y_{TR})$ patch center points, and the number of patch columns (numcols) in the color target (determined at block 404). The same technique is also performed on the bottom row of patches, using the bottom-left $(X_{BL}, Y_{BL})$ and bottom-right $(X_{BR}, Y_{BR})$ patch center points.

The linear interpolation is performed by determining a distance vector between patch centers in the top row, and a distance vector between patch centers in the bottom row. These distance vectors are calculated using the following equations:

$$X_{DVTOP} = (X_{TR} - X_{TL})/(\text{numcols}-1) \quad \text{Equation (3)}$$

$$Y_{DVTOP} = (Y_{TR} - Y_{TL})/(\text{numcols}-1) \quad \text{Equation (4)}$$

$$X_{DVBOT} = (X_{BR} - X_{BL})/(\text{numcols}-1) \quad \text{Equation (5)}$$

$$Y_{DVBOT} = (Y_{BR} - Y_{BL})/(\text{numcols}-1) \quad \text{Equation (6)}$$

Equations 3 and 4 provide the X and Y components, respectively, of the distance vector for the top row, and Equations 5 and 6 provide the X and Y components, respectively, of the distance vector for the bottom row.

The center point of patches in the Nth column of the top and bottom rows (TOPCOL(N) and BOTCOL(N), respectively) can be determined using the following equations.

$$\text{TOPCOL}(N) = TL + ((N-1) \times DVTOP) \quad \text{Equation (7)}$$

$$\text{BOTCOL}(N) = BL + ((N-1) \times DVBOT) \quad \text{Equation (8)}$$

For example, the center point of the fifth patch in the top row (i.e., A) is determined by adding the top row distance vector (DVTOP) to the top-left patch center point four times (i.e., A=TL+(4×DVTOP)). Similarly, the center point of the fifth patch in the bottom row (i.e., B) is determined by adding the bottom row distance vector (DVBOT) to the bottom-left patch center point four times (i.e., B=BL+(4×DVBOT)).

To determine the center point for a patch in column(N) (that is not in the top or bottom row of the column), a distance vector between patch centers in column(N) is calculated from the center of the patch in the top row $(X_{TOPCOL(N)}, Y_{TOPCOL(N)})$ and the center of the patch in the bottom row $(X_{BOTCOL(N)}, Y_{BOTCOL(N)})$ using the following equations:

$$X_{DVCOL(N)} = (X_{BOTCOL(N)} - X_{TOPCOL(N)})/(\text{numrows}-1) \quad \text{Equation (9)}$$

$$Y_{DVCOL(N)} = (Y_{BOTCOL(N)} - Y_{TOPCOL(N)})/(\text{numrows}-1) \quad \text{Equation (10)}$$

Equations 9 and 10 provide the X and Y components, respectively, of the distance vector between the patch centers of column(N). Numrows is the number of rows of patches in the color target determined at block 404.

The center point of a patch in row(M) of column(N) (i.e., ROW(M)COL(N)) can be determined using the following equation:

$$\text{ROW}(M)\text{COL}(N) = \text{TOPCOL}(N) + ((M-1) \times DVCOL(N)) \quad \text{Equation (11)}$$

For example, the center point of the patch in the second row of the fifth column (i.e., C) is determined by adding the fifth column distance vector (i.e., DVCOL(5)) to the center point of the patch in the first row of the fifth column (i.e., A) one time (i.e., C=A+(1×DVCOL(5))). In this manner, the centers of color patches of a color target can be determined based on the centers of the top left, top right, bottom left, and bottom right corner patches selected at block 403 of FIG. 4, and the number of patch rows and columns in the color target (determined at block 404).

FIG. 10 is an architecture diagram for a data processing apparatus, such as a general purpose computing machine, suitable for performing the processes described above for FIGS. 1, 3, 4, and 9. The data processing apparatus 1000 includes a processor 1001 coupled to a memory 1002 via system bus 1004. The processor is also coupled to external Input/Output (I/O) devices via the system bus and an I/O bus 1005. A storage device having computer system readable media 1006 is coupled to the processor via a storage device controller 1008 and the I/O bus and the system bus. The storage device is used by the processor to store and read data 1010 and program instructions 1012 used to implement the features of generating a color profile as described above.

The processor may be further coupled to a user output device 1018 via a user output device controller 1020 coupled to the I/O bus. The processor uses the user output device to display a user interface to a user to prompt the user of selections of parameters used in the color profile generation process.

The processor may be further coupled to a user input device 1009 via a user input device controller 1016 coupled to the I/O bus. The processor uses the user input device to receive selections of parameters used in the color profile generation process.

The processor may be further coupled to a communications device 1022 via a communications device controller 1024 coupled to the I/O bus. The processor may use the communications device to communicate with another device for transferring a color profile and/or an image.

In operation, the processor loads the program instructions from the storage device into the memory. The processor executes the loaded program instructions to implement the features of the color profile generation process as described above.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. An apparatus for generating a color profile for a digital input device, the apparatus comprising:
   a computer-readable memory constructed to store computer-executable instructions implementing process steps; and
   a processor constructed to execute the computer-executable instructions stored in the memory;
   wherein the process steps implemented by the instructions stored in the memory comprise:

obtaining, by using the digital input device, image data for each of a plurality of color targets placed within a first scene at positions of which lighting conditions are different from each other, the plurality of color targets each having a reference color patch and other color patches;

obtaining a measured value for each of the reference patches of the plurality of color targets under each of the lighting conditions;

inputting pre-measured values of the reference patch and the other color patches of each of the plurality of color targets;

calculating, for each of the plurality of color targets, a scale factor based on the measured value of the reference patch and the pre-measured value of the reference patch;

transforming, by using the scale factor, the pre-measured values of the other color patches for each of the plurality of color targets; and generating the color profile for the digital input device by using the measured value of the reference color patch, the transformed pre-measured values of the other color patches, and the image data of each of the plurality of color targets.

2. An apparatus according to claim 1, wherein the digital input device comprises a digital camera.

3. An apparatus according to claim 1, wherein each of the plurality of lighting conditions has a different illuminant value and degree of brightness.

4. An apparatus according to claim 1, wherein the color profile includes an International Color Consortium (ICC) color profile.

5. An apparatus according to claim 1, wherein in transforming the pre-measured values, a Chromatic Adaptation Transformation (CAT) is used.

6. An apparatus according to claim 5, wherein the CAT includes CAT97, CAT2000, and XYZ scaling.

7. An apparatus according to claim 1, wherein the reference color patch is the brightest white patch.

8. A method for generating a color profile for a digital input device, the method comprising:

obtaining, by using the digital input device, image data for each of a plurality of color targets placed within a first scene at positions of which lighting conditions are different from each other, the plurality of color targets each having a reference color patch and other color patches;

using at least one processor to:

output a measured value for each of the reference patches of the plurality of color targets under each of the lighting conditions;

input pre-measured values of the reference patch and the other color patches of each of the plurality of color targets;

calculate, for each of the plurality of color targets, a scale factor based on the measured value of the reference patch and the pre-measured value of the reference patch;

transform, by using the scale factor, the pre-measured values of the other color patches for each of the plurality of color targets; and generate the color profile for the digital input device by using the measured value of the reference color patch, the transformed pre-measured values of the other color patches, and the image data of each of the plurality of color targets.

9. A computer-readable storage medium on which is retrievably stored computer-executable instructions implementing process steps for generating a color profile for a digital input device, the process steps comprising:

obtaining, by using the digital input device, image data for each of a plurality of color targets placed within a first scene at positions of which lighting conditions are different from each other, the plurality of color targets each having a reference color patch and other color patches;

obtaining a measured value for each of the reference patches of the plurality of color targets under each of the lighting conditions;

inputting pre-measured values of the reference patch and the other color patches of each of the plurality of color targets;

calculating, for each of the plurality of color targets, a scale factor based on the measured value of the reference patch and the pre-measured value of the reference patch;

transforming, by using the scale factor, the pre-measured values of the other color patches for each of the plurality of color targets; and generating the color profile for the digital input device by using the measured value of the reference color patch, the transformed pre-measured values of the other color patches, and the image data of each of the plurality of color targets.

10. An apparatus for generating a color profile for a digital input device, the apparatus comprising:

means for obtaining, by using the digital input device, image data for each of a plurality of color targets placed within a first scene at positions of which lighting conditions are different from each other, the plurality of color targets each having a reference color patch and other color patches;

means for obtaining a measured value for each of the reference patches of the plurality of color targets under each of the lighting conditions;

means for inputting pre-measured values of the reference patch and the other color patches of each of the plurality of color targets;

means for calculating, for each of the plurality of color targets, a scale factor based on the measured value of the reference patch and the pre-measured value of the reference patch;

means for transforming, by using the scale factor, the pre-measured values of the reference patch and the other color patches for each of the plurality of color targets; and means for generating the color profile for the digital input device by using the measured value of the reference color patch, the transformed pre-measured values of the other color patches, and the image data of each of the plurality of color targets.

* * * * *